United States Patent
Schenk et al.

(10) Patent No.: US 11,878,812 B2
(45) Date of Patent: Jan. 23, 2024

(54) AIRCRAFT ACCESSORY UNIT POWERED BY RAM AIR TURBINE

(71) Applicant: Rolls-Royce Corporation, Indianapolis, IN (US)

(72) Inventors: Peter M. Schenk, Greenwood, IN (US); Rigoberto Rodriguez, Avon, IN (US); David Locascio, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 183 days.

(21) Appl. No.: 17/702,754

(22) Filed: Mar. 23, 2022

(65) Prior Publication Data

US 2023/0303263 A1    Sep. 28, 2023

(51) Int. Cl.
| | |
|---|---|
| *B64D 41/00* | (2006.01) |
| *H02K 1/2783* | (2022.01) |
| *H02K 9/22* | (2006.01) |
| *H02K 7/00* | (2006.01) |
| *F01D 15/10* | (2006.01) |
| *H02K 7/08* | (2006.01) |

(52) U.S. Cl.
CPC ......... *B64D 41/007* (2013.01); *H02K 1/2783* (2022.01); *H02K 7/006* (2013.01); *H02K 7/08* (2013.01); *H02K 9/22* (2013.01); *F01D 15/10* (2013.01)

(58) Field of Classification Search
CPC .... B64D 41/007; H02K 1/2783; H02K 7/006; H02K 7/08; H02K 9/22; H02K 1/2792; H02K 7/14; H02K 7/20; H02K 21/22; H02K 7/1823; F01D 15/10; F05D 2220/34

USPC ........................................................... 60/786
See application file for complete search history.

(56) References Cited

U.S. PATENT DOCUMENTS

| | | | |
|---|---|---|---|
| 5,249,924 A * | 10/1993 | Brum ..................... | F03D 15/10 416/162 |
| 5,376,827 A | 12/1994 | Hines | |
| 5,564,903 A | 10/1996 | Eccles et al. | |
| 5,607,329 A | 3/1997 | Cho et al. | |
| 6,127,758 A * | 10/2000 | Murry .................. | B64D 41/007 290/55 |
| 7,603,864 B2 * | 10/2009 | Gemin .................... | F01D 15/10 290/1 A |
| 7,837,141 B2 | 11/2010 | Kennedy et al. | |
| 7,841,163 B2 | 11/2010 | Welch et al. | |
| 7,982,328 B2 | 7/2011 | Huntemann | |
| 8,146,369 B2 | 4/2012 | Walitzki et al. | |
| 8,299,669 B2 | 10/2012 | Gieras et al. | |
| 8,766,471 B2 | 7/2014 | Orea | |

(Continued)

FOREIGN PATENT DOCUMENTS

| | | |
|---|---|---|
| CN | 101374724 B | 4/2012 |
| CN | 104500267 A | 4/2015 |

(Continued)

*Primary Examiner* — J. Todd Newton
(74) *Attorney, Agent, or Firm* — Barnes & Thornburg LLP

(57) ABSTRACT

The present disclosure is directed to an aircraft with an accessory system configured to be powered independent of the primary propulsion system by a ram air turbine power system. The ram air turbine power system illustratively includes an accessory generator integrated with a turbine rotor as well as other components so as to manage space claim and offer unique functionality.

17 Claims, 4 Drawing Sheets

(56) References Cited

U.S. PATENT DOCUMENTS

| | | |
|---|---|---|
| 8,790,079 B2 | 7/2014 | Tersmette et al. |
| 8,970,059 B2 | 3/2015 | Russ et al. |
| 9,143,023 B1* | 9/2015 | Uskert .................. H02K 99/20 |
| 9,908,635 B2 | 3/2018 | Snyder |
| 10,030,961 B2 | 7/2018 | Dzięcioł et al. |
| 10,094,336 B2 | 10/2018 | Makowski et al. |
| 10,399,694 B2 | 9/2019 | Huang et al. |
| 10,752,375 B2 | 8/2020 | Snyder |
| 10,899,467 B2 | 1/2021 | Hausmann |
| 10,954,792 B2 | 3/2021 | Lugg |
| 10,954,875 B2 | 3/2021 | Weightman et al. |
| 11,719,119 B1* | 8/2023 | Schenk ................ F01D 11/122 |
| | | 416/223 R |
| 2002/0122717 A1* | 9/2002 | Ghetzler ................ F01D 17/14 |
| | | 415/35 |
| 2006/0137355 A1* | 6/2006 | Welch .................. H02K 7/1823 |
| | | 60/802 |
| 2008/0042507 A1 | 2/2008 | Edelson |
| 2008/0110151 A1 | 5/2008 | Welch et al. |
| 2009/0026770 A1 | 1/2009 | Huntemann |
| 2009/0206208 A1 | 8/2009 | Kennedy et al. |
| 2010/0326050 A1* | 12/2010 | Schilling ................ H02K 16/02 |
| | | 60/268 |
| 2011/0033280 A1* | 2/2011 | Justak ...................... F02C 7/32 |
| | | 415/73 |
| 2011/0133485 A1* | 6/2011 | Gieras .................. B64D 41/007 |
| | | 290/1 R |
| 2012/0093668 A1 | 4/2012 | Gieras et al. |
| 2012/0148424 A1* | 6/2012 | Hopewell ............. F03B 13/264 |
| | | 310/156.01 |
| 2012/0299558 A1* | 11/2012 | Justak ...................... F03D 1/04 |
| | | 290/52 |
| 2012/0301273 A1* | 11/2012 | Justak ...................... F03D 1/04 |
| | | 415/127 |
| 2012/0301290 A1* | 11/2012 | Justak ...................... F03D 9/00 |
| | | 415/208.2 |
| 2013/0048780 A1* | 2/2013 | Masoudipour ........... F02C 7/32 |
| | | 244/58 |
| 2013/0181448 A1 | 7/2013 | Larson et al. |
| 2013/0257053 A1 | 10/2013 | Russ |
| 2014/0077498 A1 | 3/2014 | Orea |
| 2019/0300199 A1 | 10/2019 | Hausmann |
| 2020/0227988 A1* | 7/2020 | Zhu ........................ B64C 11/46 |
| 2022/0009644 A1* | 1/2022 | Rabbi ................... B64D 29/00 |

FOREIGN PATENT DOCUMENTS

| | | |
|---|---|---|
| CN | 104500267 B | 2/2016 |
| CN | 110318880 A | 10/2019 |
| CN | 110318880 B | 11/2021 |
| DE | 102006003138 A1 | 8/2007 |
| EP | 2715124 B1 | 6/2016 |
| JP | 2020083062 A | 6/2020 |
| WO | 2012091828 A2 | 7/2012 |
| WO | 2012091828 A3 | 8/2012 |
| WO | 2012166271 A3 | 4/2013 |
| WO | 2018075020 A1 | 4/2018 |

* cited by examiner

AIRCRAFT ACCESSORY UNIT POWERED BY RAM AIR TURBINE

FIELD OF THE DISCLOSURE

The present disclosure relates generally to aircraft accessory power systems, and more specifically to ram air turbines for powering aircraft accessories.

BACKGROUND

Aircraft have been fitted with ram air turbines (RATs) configured to generate power from ram pressure derived from the airstream across a moving aircraft. These ram air turbines have been used in emergency situations in the case of primary power source loss to operate critical controls, hydraulics, and/or instrumentation.

Ram air turbines have also been incorporated into independent units or pods included in aircraft. Use of ram air turbines in independent units allows installation onto aircraft without dedicated power supplies from primary electrical systems of the aircraft. Some such independent units have incorporated exposed turbine rotors coupled via shafts to generators to power electronics or to pressurize hydraulics.

Next generation independent units or pods for use with existing or new aircraft continue to demand independent power generation capability to provide flexibility of use. In these aircraft improved packaging and functionality for ram air turbine technology is of significant interest.

SUMMARY

The present disclosure may comprise one or more of the following features and combinations thereof.

According to an illustrative aspect of the present disclosure, an aircraft includes a propulsion system, an optional accessory system, and a ram air turbine power system. The propulsion system is configured to produce thrust for driving the aircraft during operation. The optional accessory system is mechanically and electrically de-coupled from the propulsion system so as not to directly draw power from the propulsion system. The ram air turbine power system is electrically coupled to the accessory system to provide energy for use by the accessory system.

The ram air turbine power system includes a turbine case, a turbine rotor, and an accessory generator. The turbine case extends around a central axis. The turbine rotor is mounted for rotation about the central axis. The accessory generator is coupled to the turbine rotor.

The turbine rotor includes an outer diameter, an inner diameter, and airfoils. The outer diameter is in direct confronting relation with the turbine case. The inner diameter is spaced radially inward of the outer diameter. The airfoils are arranged between the outer diameter and the inner diameter.

The accessory generator includes a series of magnets and a series of stator windings. The series of magnets is coupled to the inner diameter of the turbine rotor at a location axially aligned along the central axis with the airfoils. The series of stator windings are mounted radially inward of the series of magnets at a location axially aligned along the central axis with the series of magnets so that, upon rotation of the series of magnets with the turbine rotor, electrical power is generated for use by the accessory system.

In some embodiments, the series of magnets includes a plurality of magnets arranged circumferentially adjacent to one another around the central axis. Each of the plurality of magnets is oriented so that magnetic directionality is selected and the series of magnets forms a Halbach array configured to provide managed power density.

In some embodiments, the ram air turbine power system further includes a plurality of inlet guide vanes. The inlet guide vanes are configured to redirect air moving into the turbine case for interaction with the airfoils of the turbine rotor. Power off-take wires extend from the stator windings radially outward along the turbine inlet guide vanes so that heat from the power off-take wires is supplied to the plurality of turbine inlet guide vanes. In some embodiments, the turbine rotor is mounted on a bearing configured to support the turbine rotor for rotation about the central axis and power off-take wires extend from the stator windings through an internal diameter of the bearing so as to route electrical power to the accessory system.

In some embodiments, the series of magnets are in direct thermal contact with the turbine rotor so that heat generated in the series of magnets is dissipated through the airfoils and other turbine components exposed to air flow moving through the turbine case.

In some embodiments, the ram air turbine power system is housed in a pod. The pod has a selectively opened turbine inlet configured to modulate air flow allowed into the turbine case for interaction with the turbine rotor to regulate speed of the turbine rotor as well as the series of magnets and thereby control power output of the accessory generator. In some embodiments, the pod has a selectively opened turbine outlet configured to modulate air flow allowed out of the turbine case for interaction with the turbine rotor so as to regulate speed of the turbine rotor as well as the series of magnets and thereby control power output of the accessory generator.

In some embodiments, the optional accessory system and the ram air turbine power system are housed in a pod detachably coupled to other components of the aircraft so as to form an independent unit primarily self-powered via the ram air turbine power system. In some embodiments, the optional accessory system includes radar jamming electronics so that the independent unit is a radar jamming unit detachably coupled to other components to selectively add radar jamming capability to the aircraft.

According to another illustrative aspect of the disclosure, an independently powered unit configured to be coupled to an aircraft includes a pod, an accessory system, and a ram air turbine power system. The pod includes attachment points for coupling the unit to the aircraft and defining an interior space. The accessory system is mounted in the interior space of the pod. The ram air turbine power system is also mounted in the interior space of the pod and electrically coupled to the accessory system to provide energy for use by the accessory system.

The ram air turbine power system includes a turbine rotor and an accessory generator. The turbine rotor is mounted for rotation about a central axis and includes airfoils outward from an inner diameter of the turbine rotor. The accessory generator generates electrical power for use by the accessory system.

The accessory generator includes a series of magnets and a series of stator windings. The series of magnets is coupled to the inner diameter of the turbine rotor at a location axially aligned along the central axis with the airfoils. The series of stator windings is mounted radially inward of the series of magnets at a location axially aligned along the central axis with the series of magnets so that, upon rotation of the series of magnets with the turbine rotor, electrical power is generated for use by the accessory system.

In some embodiments, the series of magnets includes a plurality of magnets arranged circumferentially adjacent to one another around the central axis. Each of the plurality of magnets is oriented so that magnetic directionality is selected and the series of magnets forms a Halbach array configured to provide managed power density.

In some embodiments, the ram air turbine power system further includes a plurality of turbine inlet guide vanes and power off-take wires. The plurality of inlet guide vanes are configured to redirect air moving toward interaction with the airfoils of the turbine rotor. The power off-take wires extend from the stator windings radially outward along the turbine inlet guide vanes so that heat from the power off-take wires is supplied to the plurality of turbine inlet guide vanes. In some embodiments, the turbine rotor is mounted on a bearing configured to support the turbine rotor for rotation about the central axis and power off-take wires extend from the stator windings through an internal diameter of the bearing so as to route electrical power to the accessory system.

In some embodiments, the pod has a turbine inlet door configured to modulate air flow into the pod toward interaction with the turbine rotor. In some embodiments, the pod has a turbine outlet door configured to modulate air flow allowed out of the pod after interaction with the turbine rotor.

In some embodiments, the accessory system includes radar jamming electronics.

According to another aspect of the disclosure, a ram air turbine power system mounted in the interior space of a pod configured to be detachably coupled to a vehicle includes a turbine rotor and an accessory generator. The turbine rotor is mounted for rotation about a central axis, and includes an inner diameter and airfoils arranged radially outward of the inner diameter. The accessory generator generates electrical power.

The accessory generator includes a series of magnets and a series of stator windings. The series of magnets is coupled to the inner diameter of the turbine rotor at a location axially aligned along the central axis with the airfoils. The series of stator windings is mounted radially inward of the series of magnets at a location axially aligned along the central axis with the series of magnets so that, upon rotation of the series of magnets with the turbine rotor relative to the series of stator windings, electrical power is generated.

In some embodiments, the ram air power system further includes a plurality of turbine inlet guide vanes and power off-take wires. The plurality of turbine inlet guide vanes are configured to redirect air moving toward interaction with the airfoils of the turbine rotor. The power off-take wires extend from the stator windings radially outward along the turbine inlet guide vanes so that heat from the power off-take wires is supplied to the plurality of turbine inlet guide vanes.

In some embodiments, the series of magnets are in direct thermal contact with the turbine rotor so that heat generated in the series of magnets is dissipated through the airfoils via air flow interacting with the airfoils.

These and other features of the present disclosure will become more apparent from the following description of the illustrative embodiments.

DETAILED DESCRIPTION OF THE DRAWINGS

Figure 1:
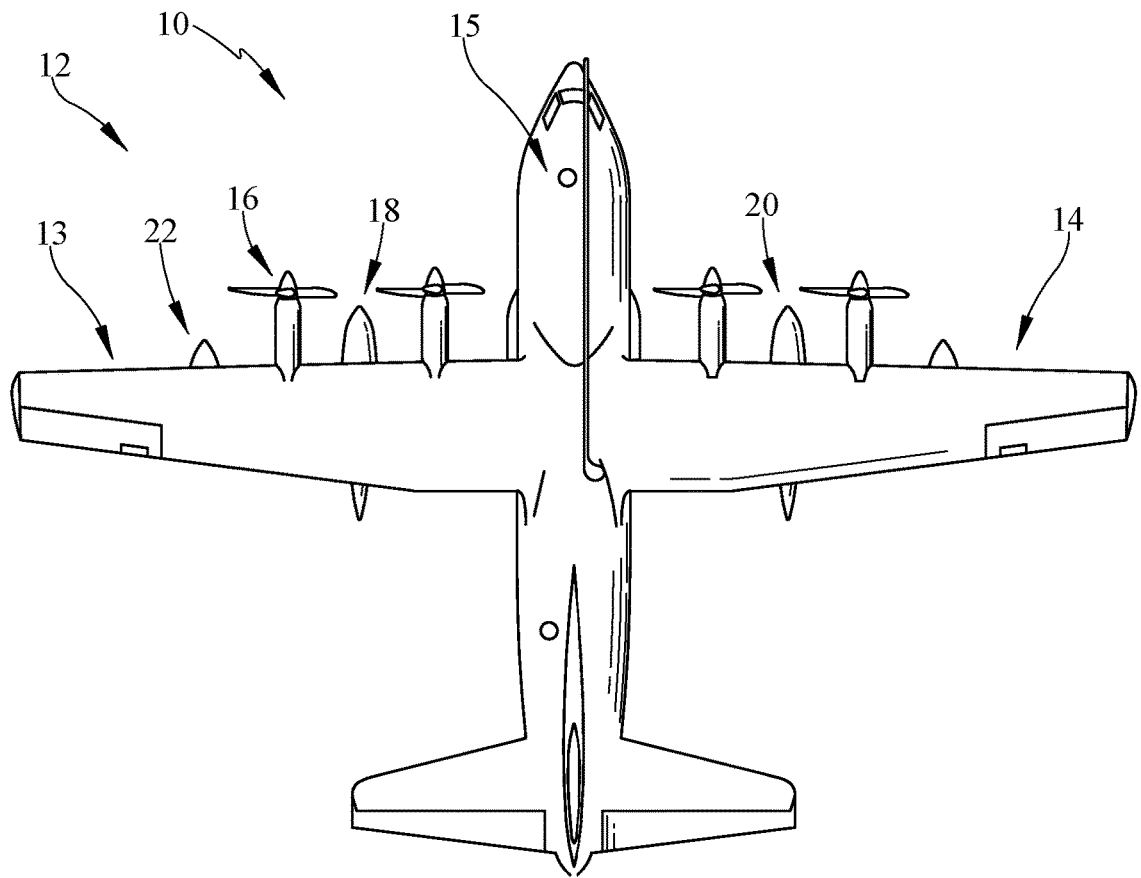
FIG. 1 is a perspective view of an aircraft in accordance with the present disclosure showing various pods and missiles detachably coupled to wings of the aircraft, the various pods including a radar jamming pod housing a ram air turbine power system for powering radar jamming electronics in the pod.

For the purposes of promoting an understanding of the principles of the present disclosure, reference will now be made to an illustrative embodiment shown in the drawings.

An aircraft 10 in accordance with the present disclosure can be outfitted in a modular fashion with different accessory weapons and systems as suggested in FIG. 1. The aircraft 10 includes an airframe 12 with wings 13, 14 extending from a fuselage 15, a propulsion system 16, as well as various detachable units/pods 18, 20 and missiles 22. The propulsion system 16 is illustratively provided by a gas turbine engine housed in the airframe 12. The units 18, 20 and missiles 22 are detachably coupled to wings 13, 14 and/or fuselage 15 of the aircraft 10.

Figure 2:
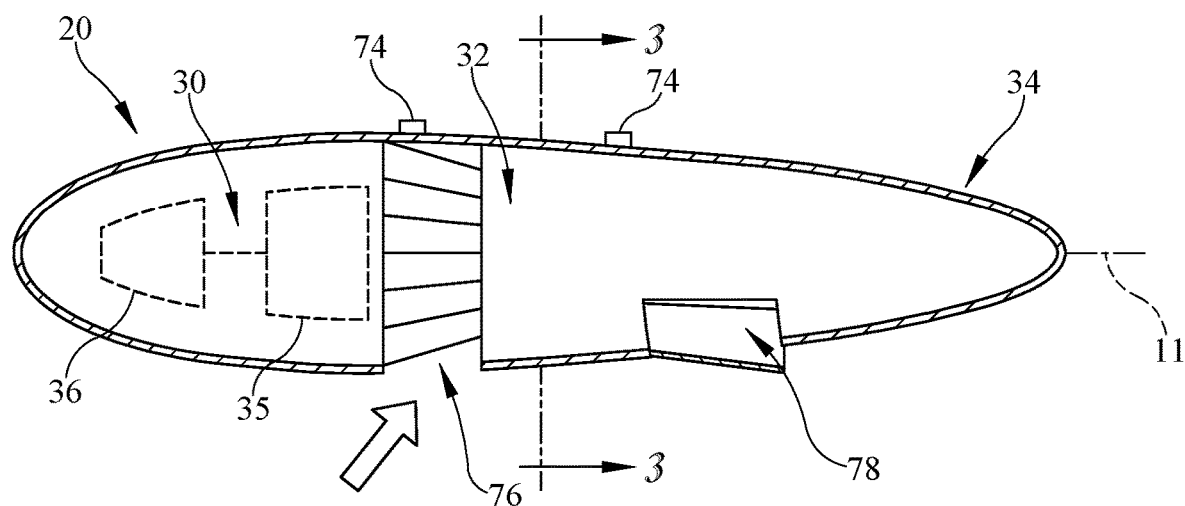
FIG. 2 is a perspective view of the radar jamming pod of FIG. 1 showing that the pod includes an aircraft attachment point as well as inlet/outlet doors that can be selectively opened to allow air to pass interact with the ram air turbine power system.

In the illustrative embodiment, one detachable accessory unit 20 is a radar jamming pod as suggested in FIG. 2. The accessory unit 20 includes a power-consuming accessory system 30 and a ram air turbine power system 32 arranged in a detachable pod or housing 34. The ram air turbine power system 32 generates electrical power from air passing through the unit 20 when the aircraft is in flight. Electrical power from the ram air turbine power system 32 is passed to the accessory system 30 independent of direct mechanical or electrical connection to the propulsion system 16. Thus, the accessory unit 20 is, at least primarily, self-powered.

The accessory system 30 included in the accessory unit 20 is illustratively made up of power electronics 35 and radar jamming electronics 36 as suggested diagrammatically in FIG. 2. The power electronics 35 may be a rectifier 35. The radar jamming electronics 36 are configured to radiate signals suitable for interfering with enemy radar. In other embodiments, the accessory system 30 can include sensor electronics, energy weapon electronics, battery packs, and/or other power-consuming devices.

Figure 3:
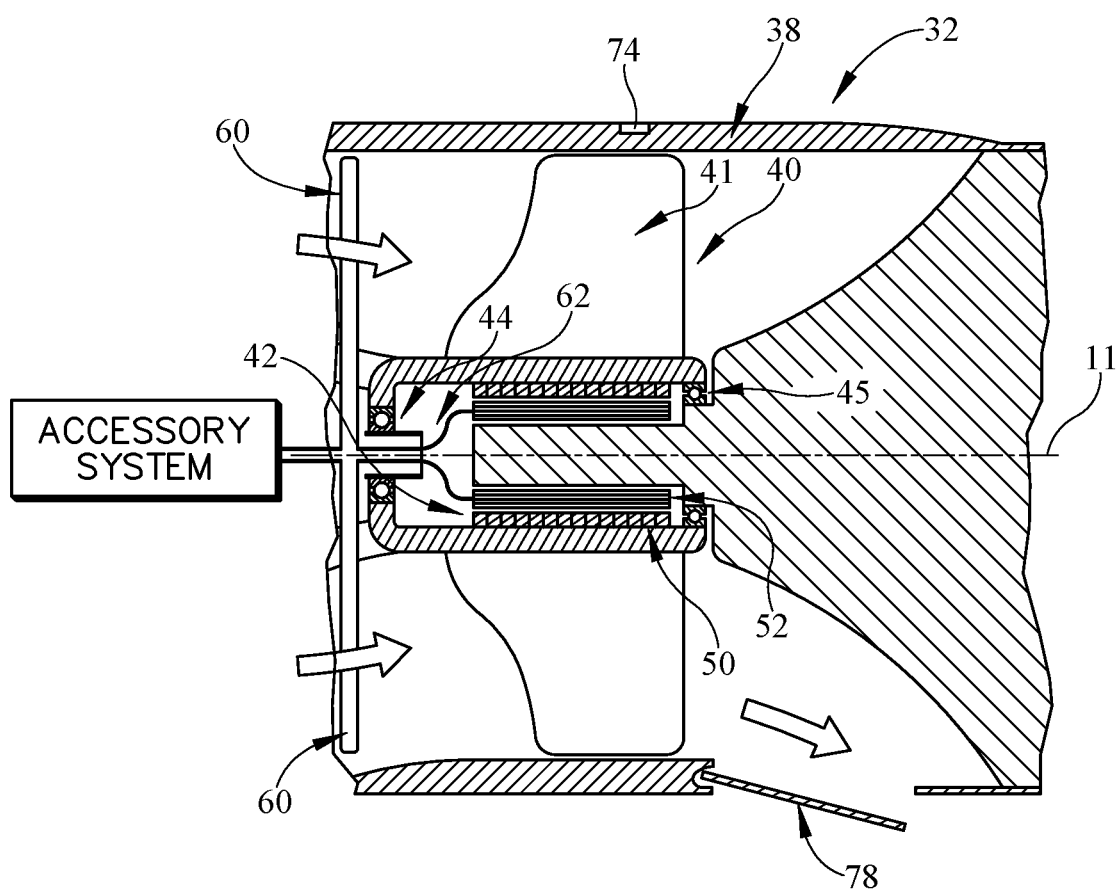
FIG. 3 is a cross-sectional view of a portion of the radar jamming pod of FIG. 2 showing that the ram air turbine power system includes a turbine rotor and an accessory generator with a series of magnets coupled to an inner diameter of the turbine rotor.
Figure 4:
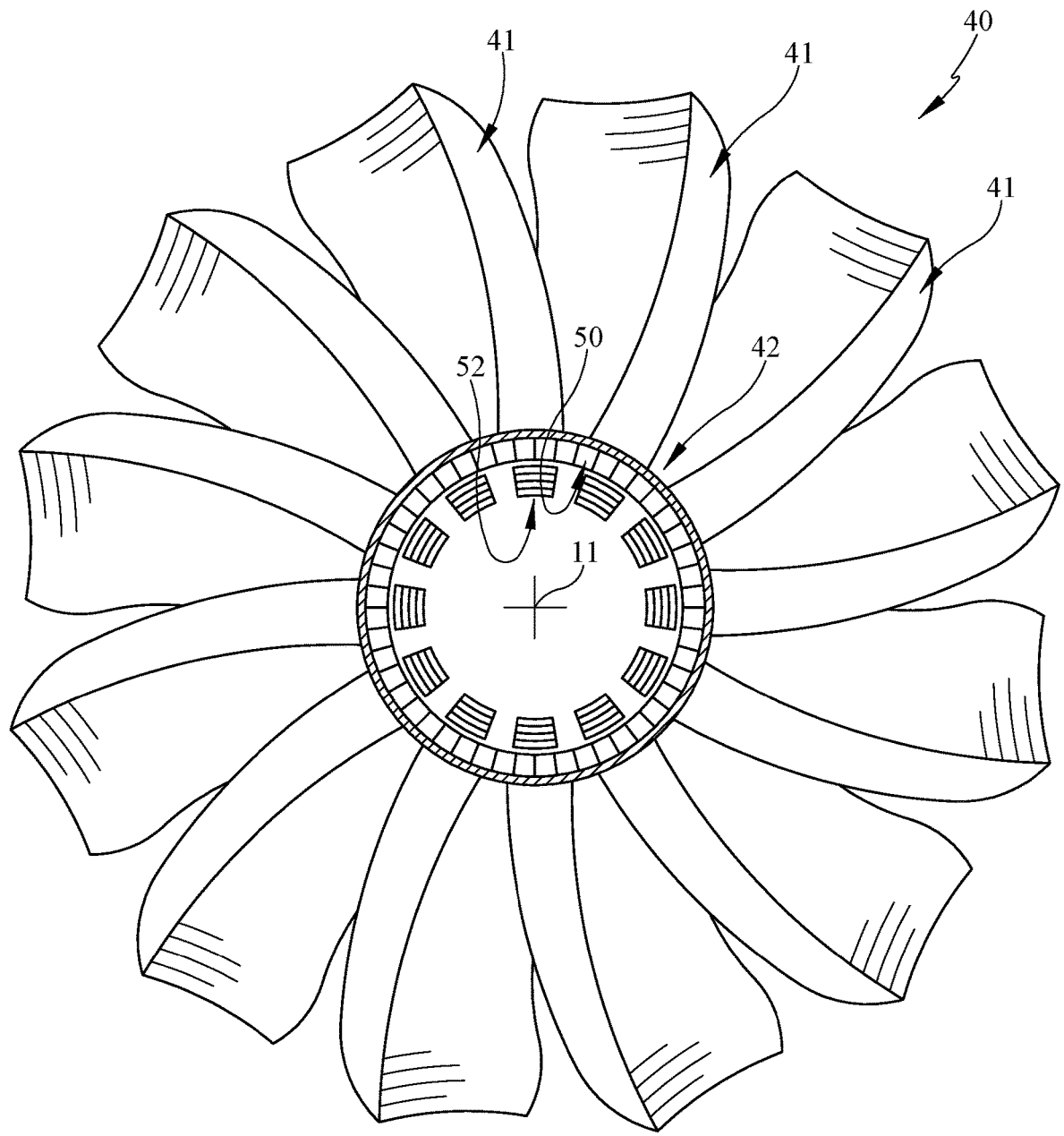
FIG. 4 is a forward looking aft plan view of the magnets of the accessory generator coupled to the turbine rotor and arranged radially outward of the stator windings.
Figure 5:
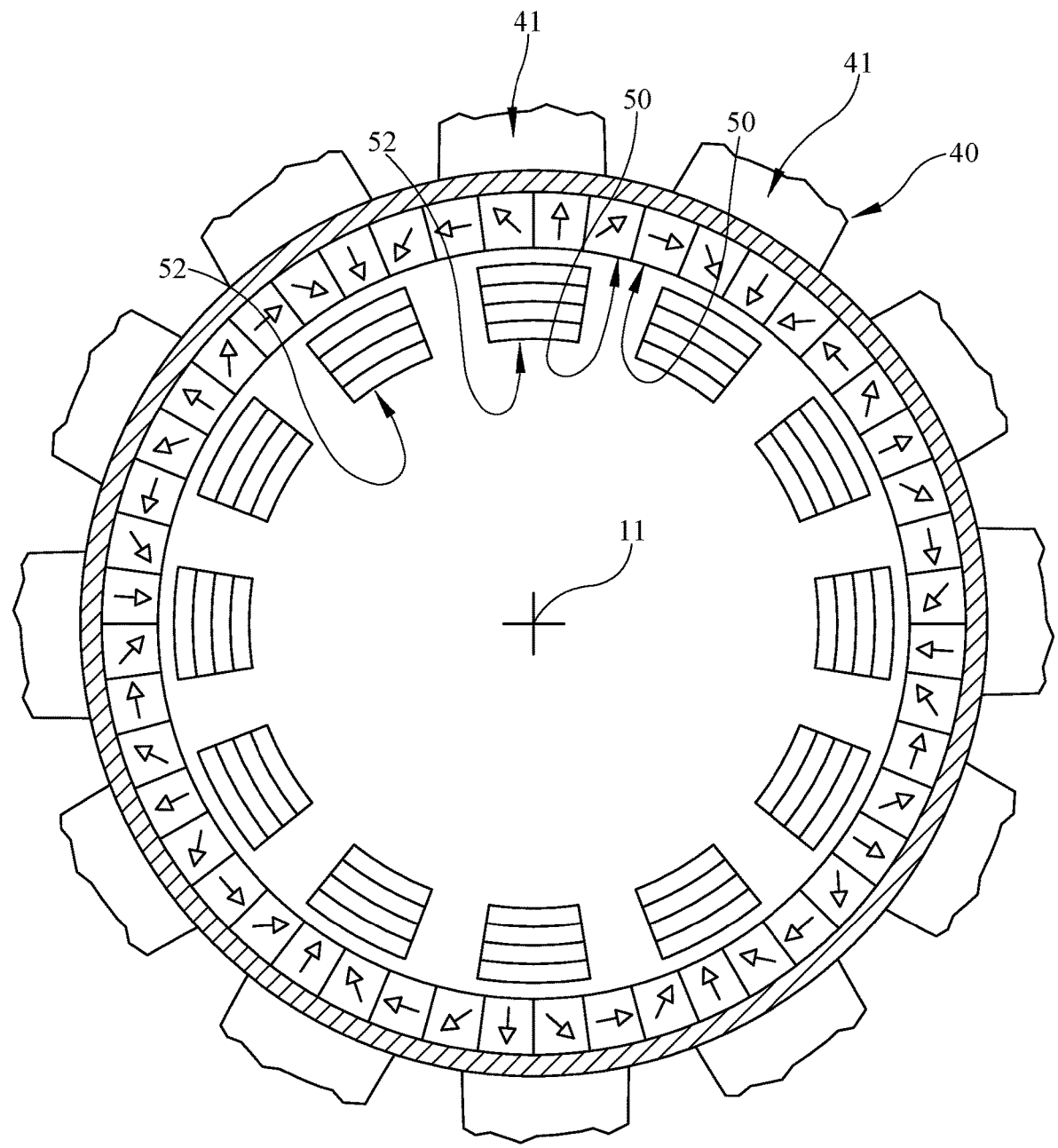
FIG. 5 is a detail view of the radially inner portion of FIG. 4 with arrows applied to each of the series of magnets indicating a preselected orientation of the magnetic directionality so as to form a Halbach array configured to produce smooth, managed power density generation in the stator windings upon rotation of the magnets.

The ram air turbine power system 32 in the illustrated embodiment integrates power generation components with turbine components to manage space claim and offer unique functionality to the accessory unit 20 as suggested in FIGS. 3-5. The ram air turbine power system 32 includes a turbine case 38, a turbine rotor 40, and an accessory generator 42. The turbine case 38 extends around a central axis 11 and defines a radially-outer limit of a flow path through which air moves to interact with the turbine rotor 40. The turbine rotor 40 is mounted for rotation about the central axis 11 and includes airfoils 41 arranged radially outward of the accessory generator 42.

The accessory generator 42 is packaged with the turbine rotor 40 to allow for space management and to provide other features in the accessory unit 20 as suggested in FIGS. 2-4. The accessory generator 42 includes a series of magnets 50 and a series of stator windings 52 as shown in FIGS. 3-5. The magnets 50 are coupled to an inner diameter of the turbine rotor 40 at a location axially aligned along the central axis 11 with the airfoils 41. The series of stator windings 52 are mounted radially inward of the series of magnets at a location axially aligned along the central axis with the series of magnets 50 so that, upon rotation of the series of magnets 50 with the turbine rotor 40, electrical power is generated for use by the accessory system 30.

In the illustrative embodiment, the series of magnets 50 includes a plurality of magnets arranged circumferentially adjacent to one another around the central axis 11 as shown in FIGS. 4 and 5. Each of the magnets is oriented so that magnetic directionality is specifically selected and the series of magnets 50 forms a Halbach array configured to provide managed power density. Additionally, the series of magnets 50 are in direct thermal contact with the turbine rotor 40 so that heat generated in the series of magnets 50 is dissipated through the airfoils 41 and other turbine components exposed to air flow moving through the turbine case 38.

Bearings 44, 45 support the turbine rotor 40 for rotation about the central axis 11. Power off-take wires 62 extend from the stator windings 52 through an internal diameter of the bearing 44 so as to route electrical power to the accessory system 30.

The ram air turbine power system 32 further includes a plurality of turbine inlet guide vanes 60 as shown in FIG. 3. The turbine inlet guide vanes 60 are configured to redirect air moving into the turbine case 38 for interaction with the airfoils 41 of the turbine rotor 40. In some optional embodiments, at least some of the power off-take wires 62 extend from the stator windings 52 radially outward along the turbine inlet guide vanes 60. Heat from the power off-take wires 62 is supplied to the plurality of turbine inlet guide vanes 60. In other embodiments, at least some of the power off-take wires 62 loop radially outward of the turbine inlet guide vanes 60 such that the heat from the power take-off wires 62 provides anti-ice protection for the ram air turbine power system 32. Anti-ice protection for the ram turbine power system 32 may also be achieved by switching at least some of the power off-take wires 62 on and off.

The detachable pod or housing 34 illustratively includes attachment points 74 for coupling to hard point attachment points of the aircraft 10 as suggested in FIGS. 1 and 2. The pod 34 defines an interior space that houses the accessory system 30 and the ram air turbine power system 32. The pod 34 includes an inlet door 76 and an outlet door 78 configured to selectively open to varying levels so as to modulate air flow allowed into and out of the turbine case 38 for interaction with the turbine rotor 40. In this way, speed of the turbine rotor 40 as well as the series of magnets 50 and thereby control power output of the accessory generator 42. Inlet and outlet doors 76, 78 may be moved among various opened positions by an actuator powered by the ram air turbine power system 32, a battery, the propulsion system 16, and/or mechanical linkages also suitable for release of missiles etc.

According to the present disclosure, a ram air turbine 40 provides mechanical energy to an electrical generator 42 for dc power. In some designs, a ram air turbine is a separate unit; the generator is a separate unit; and the rectifier is a separate unit. Designs in accordance with the present disclosure can be lighter and smaller because of the integrated solution.

In the illustrative example, the generator 42 is integrated into the hub of the turbine 40 and is arranged with the rotor magnets 50 on the outside and the stator windings 52 on the inside. This eliminates a shaft and rotor of a separate generator while simplifying the overall design. The stator then goes inside the turbine hub and exits through the bearings. Designs with features like those shown can require a precise stator arrangement in order to preserve a small air gap between the stator windings 52 and magnets 50. Forward and/or aft bearings can provide the transition between rotating and stationary frames of reference. If required, an oil mist can cool the stator windings 52 and be scavenged out the tube containing the wires (that contacts the bearing). In the illustrative example, the power electronics 35, such as the rectifier 35, controls power offtake of the aircraft 10.

Thermal benefits may be available using designs like those disclosed. Specifically, more heat can be managed with the magnets 50 coupled to the turbine 40 since the turbine blades 41 acts as a large heat sink exposed to the incoming air stream.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An aircraft comprising
   a propulsion system configured to produce thrust for driving the aircraft during operation,
   an optional accessory system mechanically and electrically de-coupled from the propulsion system so as not to directly draw power from the propulsion system, and
   a ram air turbine power system electrically coupled to the accessory system to provide energy for use by the accessory system, the ram air turbine power system including
   a turbine case that extends around a central axis,
   a turbine rotor mounted for rotation about the central axis with an outer diameter adjacent the turbine case, an inner diameter spaced radially inward of the outer diameter, and airfoils arranged between the outer diameter and the inner diameter,
   an accessory generator including a series of magnets coupled to the inner diameter of the turbine rotor at a location axially aligned along the central axis with the airfoils and a series of stator windings mounted radially inward of the series of magnets at a location axially aligned along the central axis with the series of magnets so that, upon rotation of the series of magnets with the turbine rotor, electrical power is generated for use by the accessory system, and
   wherein the series of magnets includes a plurality of magnets arranged circumferentially adjacent to one another around the central axis and each of the plurality of magnets is oriented so that magnetic directionality is selected and the series of magnets forms a Halbach array configured to provide managed power density.

2. The aircraft of claim 1, wherein the ram air turbine power system further includes a plurality of turbine inlet guide vanes configured to redirect air moving into the turbine case for interaction with the airfoils of the turbine rotor and power off-take wires extend from the stator windings radially outward along the turbine inlet guide vanes so that heat from the power off-take wires is supplied to the plurality of turbine inlet guide vanes.

3. The aircraft of claim 2, wherein the turbine rotor is mounted on a bearing configured to support the turbine rotor for rotation about the central axis and power off-take wires extend from the stator windings through an internal diameter of the bearing so as to route electrical power to the accessory system.

4. The aircraft of claim 1, wherein the series of magnets are indirect thermal contact with the turbine rotor so that heat generated in the series of magnets is dissipated through the airfoils and other turbine components exposed to air flow moving through the turbine case.

5. The aircraft of claim 1, wherein the ram air turbine power system is housed in a pod having a selectively opened turbine inlet configured to modulate air flow allowed into the turbine case f or interaction with the turbine rotor so as to regulate speed of the turbine rotor as well as the series of magnets and thereby control power output of the accessory generator.

6. The aircraft of claim 5, wherein the pod has a selectively opened turbine outlet configured to modulate air flow allowed out of the turbine case for interaction with the turbine rotor so as to regulate speed of the turbine rotor as well as the series of magnets and thereby control power output of the accessory generator.

7. The aircraft of claim 1, wherein the optional accessory system and the ram air turbine power system are housed in a pod detachably coupled to other components of the aircraft so as to form an independent unit primarily self-powered via the ram air turbine power system.

8. The aircraft of claim 7, wherein the optional accessory system includes radar jamming electronics so that the independent unit is a radar jamming unit detachably coupled to other components so as to selectively add radar jamming capability to the aircraft.

9. An independently-powered unit configured to be coupled to an aircraft, the unit comprising
a pod with attachment points for coupling the unit to the aircraft and defining an interior space, an accessory system mounted in the interior space of the pod, and a ram air turbine power system mounted in the interior space of the pod and electrically coupled to the accessory system to provide energy for use by the accessory system,
wherein the ram air turbine power system includes
(i) a turbine rotor mounted for rotation about a central axis and having airfoils outward from an inner diameter of the turbine rotor and
(ii) an accessory generator including a series of magnets coupled to the inner diameter of the turbine rotor at a location axially aligned along the central axis with the airfoils and a series of stator windings mounted radially inward of the series of magnets at a location axially aligned along the central axis with the series of magnets so that, upon rotation of the series of magnets with the turbine rotor, electrical power is generated for use by the accessory system and
wherein the series of magnets includes a plurality of magnets arranged circumferentially adjacent to one another around the central axis and each of the plurality of magnets is oriented so that magnetic directionality is selected and the series of magnets forms a Halbach array configured to provide managed power density.

10. The aircraft of claim 9, wherein the ram air turbine power system further includes a plurality of turbine inlet guide vanes configured to redirect air moving toward interaction with the airfoils of the turbine rotor and power off-take wires that extend from the stator windings radially outward along the turbine inlet guide vanes so that heat from the power off-take wires is supplied to the plurality of turbine inlet guide vanes.

11. The aircraft of claim 10, wherein the turbine rotor is mounted on a bearing configured to support the turbine rotor for rotation about the central axis and power off-takewires extend from the stator windings through an internal diameter of the bearing so as to route electrical power to the accessory system.

12. The aircraft of claim 9, wherein the series of magnets are in direct thermal contact with the turbine rotor so that heat generated in the series of magnets is dissipated through the airfoils via air flow interacting with the airfoils.

13. The aircraft of claim 9, wherein the pod has a turbine inlet door configured to modulate air flow into the pod toward interaction with the turbine rotor.

14. The aircraft of claim 9, wherein the pod has a turbine outlet door configured to modulate air flow allowed out of the pod after interaction with the turbine rotor.

15. The aircraft of claim 9, wherein the accessory system includes radar jamming electronics.

16. A ram air turbine power system mounted in the interior space of a pod configured to be detachably coupled to a vehicle, the system comprising
a turbine rotor mounted for rotation about a central axis, the turbine rotor having an inner diameter and airfoils arranged radially outward of the inner diameter,
an accessory generator including a series of magnets coupled to the inner diameter of the turbine rotor at a location axially aligned along the central axis with the airfoils and a series of stator windings mounted radially inward of the series of magnets at a location axially aligned along the central axis with the series of magnets so that, upon rotation of the series of magnets with the turbine rotor relative to the series of stator windings, electrical power is generated and
a plurality of turbine inlet guide vanes configured to redirect air moving toward interaction with the airfoils of the turbine rotor and power off-take wires that extend from the stator windings radially outward along the turbine inlet guide vanes so that heat from the power off-take wires is supplied to the plurality of turbine inlet guide vanes.

17. The system of claim 16, wherein the series of magnets are in direct thermal contact with the turbine rotor so that heat generated in the series of magnets is dissipated through the airfoils via air flow interacting with the airfoils.

* * * * *